(12) United States Patent
Tenore et al.

(10) Patent No.: US 10,961,062 B2
(45) Date of Patent: *Mar. 30, 2021

(54) BAG PRESS FEEDER ASSEMBLY (71) Applicant: Golden Renewable Energy, LLC, Yonkers, NY (US)

(72) Inventors: Anthony F. Tenore, Yonkers, NY (US); David Fowler, Yonkers, NY (US); Oluwadare Oluwaseun, Yonkers, NY (US)

(73) Assignee: Golden Renewable Energy, LLC, Yonkers, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/628,922

(22) Filed: Jun. 21, 2017

(65) Prior Publication Data

US 2017/0361558 A1 Dec. 21, 2017

Related U.S. Application Data (63) Continuation-in-part of application No. 15/479,560, filed on Apr. 5, 2017, now abandoned.

(Continued)

(51) Int. Cl.
*B65G 53/14* (2006.01)
*C10G 1/10* (2006.01)
(Continued)

(52) U.S. Cl.
CPC .............. *B65G 53/14* (2013.01); *B01D 5/00* (2013.01); *B01D 53/002* (2013.01);
(Continued)

(58) Field of Classification Search
CPC ....... B01D 5/00; B01D 53/002; B30B 11/241; B30B 15/165; C10G 1/10; B65G 53/26; B65G 33/18; B29C 48/50
See application file for complete search history.

(56) References Cited

U.S. PATENT DOCUMENTS 836,701 A 11/1906 Oliver
2,458,068 A 11/1943 Fuller
(Continued)

FOREIGN PATENT DOCUMENTS

CA 2 660 678 A1 2/2008
CA 2 668 886 A1 5/2008
(Continued)

OTHER PUBLICATIONS

SU509433A1_ENG (Espacenet machine translation of Klimashevich) (Year: 1976).*
(Continued)

*Primary Examiner* — Jonathan Miller
*Assistant Examiner* — Gabriel E Gitman
(74) *Attorney, Agent, or Firm* — Ajay A. Jagtiani; Miles & Stockbridge P.C.

(57) ABSTRACT

A material handling apparatus is described comprising a material press body having an inlet and an outlet; a power source for generating an airstream into the inlet of the material press body and through the outlet of the material press body, wherein the airstream captures and feeds a supply material into the material press body; a plurality of press augers for capturing and manipulating the supply material into the material handling apparatus; and a drive system connected to drive and control the plurality of augers.

40 Claims, 4 Drawing Sheets

Related U.S. Application Data (60) Provisional application No. 62/319,768, filed on Jun. 21, 2016.

(51) Int. Cl.
| | |
|---|---|
| *B30B 11/24* | (2006.01) |
| *B30B 15/16* | (2006.01) |
| *B01D 5/00* | (2006.01) |
| *B01D 53/00* | (2006.01) |
| *B65G 53/26* | (2006.01) |
| *B65G 53/00* | (2006.01) |
| *B65G 33/18* | (2006.01) |

(52) U.S. Cl.
CPC .......... *B30B 11/241* (2013.01); *B30B 15/165* (2013.01); *B65G 53/26* (2013.01); *C10G 1/10* (2013.01); *B65G 33/18* (2013.01); *B65G 53/00* (2013.01)

(56) References Cited

U.S. PATENT DOCUMENTS

| | | | |
|---|---|---|---|
| 2,616,519 A | 11/1952 | Crankshaw et al. | |
| 2,916,121 A | 8/1953 | Lips et al. | |
| 3,129,459 A | 4/1964 | Kullgren et al. | |
| 3,151,784 A | 10/1964 | Tailor | |
| 3,455,789 A | 7/1969 | Landers | |
| 3,458,321 A | 7/1969 | Reinhart et al. | |
| 3,600,041 A * | 8/1971 | Hirano | B65G 53/00 406/105 |
| 3,797,702 A | 3/1974 | Robertson | |
| 3,822,866 A * | 7/1974 | Daester | B29B 7/244 366/8 |
| 3,907,259 A | 9/1975 | Leclercq | |
| 3,962,043 A | 6/1976 | Schmalfeld et al. | |
| 3,981,454 A * | 9/1976 | Williams | B02C 21/00 241/19 |
| 4,025,058 A | 5/1977 | Mizuguchi | |
| 4,123,332 A | 10/1978 | Rotter | |
| 4,261,225 A * | 4/1981 | Zahradnik | B30B 11/241 74/665 GA |
| 4,379,385 A * | 4/1983 | Reinhall | A01D 43/0633 56/16.6 |
| 4,426,018 A | 1/1984 | Ward | |
| 4,437,046 A | 3/1984 | Faillace | |
| 4,473,478 A | 9/1984 | Chivrall | |
| 4,500,481 A | 2/1985 | Marx, III | |
| 4,529,579 A | 7/1985 | Raahauge | |
| 4,640,203 A | 2/1987 | Wolter et al. | |
| 4,842,126 A * | 6/1989 | McConnell | B65G 33/265 198/666 |
| 4,875,847 A * | 10/1989 | Wenger | B30B 11/243 425/204 |
| 5,032,143 A | 7/1991 | Ritakallio | |
| 5,078,857 A | 1/1992 | Melton | |
| 5,129,995 A | 7/1992 | Agarwal | |
| 5,174,479 A | 12/1992 | Dufour | |
| 5,205,225 A | 4/1993 | Milsap, III | |
| 2,351,422 A | 6/1994 | Gohr | |
| 5,394,937 A | 3/1995 | Nieh | |
| 5,611,268 A * | 3/1997 | Hamilton | B30B 9/3089 100/50 |
| 5,720,232 A | 2/1998 | Meador | |
| 5,732,829 A * | 3/1998 | Smith | B07B 4/02 209/135 |
| 5,756,871 A | 5/1998 | Wang | |
| 5,762,666 A | 6/1998 | Amrein et al. | |
| 5,993,751 A | 11/1999 | Moriarty et al. | |
| 6,063,355 A | 5/2000 | Fujimura et al. | |
| 6,109,902 A | 8/2000 | Goris et al. | |
| 6,126,907 A | 10/2000 | Wada | |
| 6,221,329 B1 | 4/2001 | Faulkner et al. | |
| 6,270,630 B1 | 8/2001 | Xing | |
| 6,276,286 B1 * | 8/2001 | Williams | F23G 5/033 110/101 C |
| 6,298,751 B1 | 10/2001 | Ide et al. | |
| 6,387,221 B1 | 5/2002 | Schoenhard | |
| 6,455,789 B1 | 9/2002 | Allison | |
| 6,634,508 B1 * | 10/2003 | Ishigaki | B01D 29/118 210/415 |
| 6,758,150 B2 | 7/2004 | Ballantine et al. | |
| 7,144,558 B2 | 12/2006 | Smith et al. | |
| 7,301,060 B2 | 11/2007 | Appel et al. | |
| 7,311,509 B2 | 12/2007 | Lupke et al. | |
| 7,476,296 B2 | 1/2009 | Appel et al. | |
| 7,692,050 B2 | 4/2010 | Adams et al. | |
| 7,771,699 B2 | 8/2010 | Adams et al. | |
| 7,906,695 B2 | 3/2011 | Giercke | |
| 8,003,833 B2 | 8/2011 | Appel et al. | |
| 8,200,238 B2 | 6/2012 | Gildea | |
| 8,215,477 B2 | 7/2012 | Basaglia et al. | |
| 8,304,590 B2 | 11/2012 | Hopkins et al. | |
| 8,372,248 B1 | 2/2013 | Sherry | |
| 8,518,218 B2 | 8/2013 | Ali et al. | |
| 8,548,501 B2 | 10/2013 | Gildea | |
| 8,574,325 B2 | 11/2013 | Jensen et al. | |
| 8,801,904 B2 | 8/2014 | Miller et al. | |
| 8,809,606 B2 | 8/2014 | Appel et al. | |
| 8,877,992 B2 | 11/2014 | Appel et al. | |
| 9,045,693 B2 | 6/2015 | Wolfe | |
| 9,052,109 B1 * | 6/2015 | Fowler | C10B 47/44 |
| 9,220,798 B2 | 12/2015 | McKee et al. | |
| 9,275,655 B2 | 3/2016 | Wilson et al. | |
| 9,624,439 B2 | 4/2017 | Bakaya et al. | |
| 9,630,345 B2 | 4/2017 | Alsewailem | |
| 9,795,940 B2 | 10/2017 | Miller et al. | |
| 9,868,597 B2 | 1/2018 | Henry et al. | |
| 10,233,393 B2 | 3/2019 | Oluwaseun et al. | |
| 2002/0048523 A1 | 4/2002 | Achtelik et al. | |
| 2003/0047437 A1 | 3/2003 | Stankevitch | |
| 2003/0098227 A1* | 5/2003 | Okamoto | B09B 3/00 202/106 |
| 2004/0003481 A1 | 1/2004 | Tarrant | |
| 2004/0144698 A1 | 7/2004 | Hilpert et al. | |
| 2005/0219943 A1 | 10/2005 | Yamane et al. | |
| 2006/0021189 A1 | 2/2006 | Johnson | |
| 2006/0211899 A1 | 9/2006 | Lee | |
| 2007/0094929 A1 | 5/2007 | Kang et al. | |
| 2007/0179326 A1 | 8/2007 | Baker | |
| 2007/0193408 A1 | 8/2007 | Martinez | |
| 2008/0038071 A1* | 2/2008 | Bodie | B65G 53/14 406/171 |
| 2008/0081935 A1* | 4/2008 | Datsevich | C10B 49/04 585/241 |
| 2008/0105141 A1* | 5/2008 | Duperon | B30B 9/18 100/106 |
| 2008/0128259 A1 | 6/2008 | Kostek et al. | |
| 2008/0202983 A1* | 8/2008 | Smith | C10B 53/07 208/113 |
| 2008/0286557 A1 | 11/2008 | Tucker | |
| 2009/0039184 A1* | 2/2009 | Vanderpool | B09B 3/00 241/3 |
| 2009/0299110 A1* | 12/2009 | Sarker | C10G 1/10 585/14 |
| 2010/0008836 A1 | 1/2010 | Pecci | |
| 2010/0024696 A1 | 2/2010 | Cauley et al. | |
| 2010/0200229 A1 | 8/2010 | Jefferd | |
| 2010/0202243 A1 | 8/2010 | Stirner | |
| 2010/0289175 A1 | 11/2010 | Feichtinger et al. | |
| 2011/0020190 A1 | 1/2011 | Miller | |
| 2011/0089081 A1 | 4/2011 | Srinakruang | |
| 2011/0290057 A1 | 12/2011 | Corcoran | |
| 2012/0024106 A1 | 2/2012 | Brotzki | |
| 2012/0024687 A1 | 2/2012 | Bratina et al. | |
| 2012/0261247 A1 | 10/2012 | McNamara et al. | |
| 2012/0289753 A1 | 11/2012 | Luengo Marin et al. | |
| 2013/0299333 A1 | 11/2013 | Tucker et al. | |
| 2014/0054815 A1 | 2/2014 | Houk et al. | |
| 2014/0121426 A1 | 5/2014 | Tandon | |
| 2014/0332363 A1 | 11/2014 | McGolden | |
| 2014/0332444 A1 | 11/2014 | Weiss et al. | |

(56) References Cited

U.S. PATENT DOCUMENTS

| | | | |
|---|---|---|---|
| 2015/0023826 A1 | 1/2015 | Desiron | |
| 2015/0053542 A1 | 2/2015 | Liang | |
| 2015/0064297 A1 | 3/2015 | Yang | |
| 2015/0073181 A1 | 3/2015 | Gorke et al. | |
| 2015/0080624 A1 | 3/2015 | Gephart et al. | |
| 2015/0166911 A1 | 6/2015 | Reed | |
| 2015/0239166 A1* | 8/2015 | Heidemeyer | B29B 7/46 406/53 |
| 2015/0259603 A1 | 9/2015 | Hallowell et al. | |
| 2015/0314513 A1 | 11/2015 | Takamoto et al. | |
| 2015/0362183 A1 | 12/2015 | Bertram | |
| 2015/0368563 A1 | 12/2015 | Funk | |
| 2016/0068771 A1 | 3/2016 | Appel et al. | |
| 2017/0036378 A1 | 2/2017 | Yanev et al. | |
| 2017/0218278 A1 | 8/2017 | Bakaya et al. | |
| 2017/0283707 A1 | 10/2017 | Gephart et al. | |
| 2017/0361329 A1 | 12/2017 | Behrens et al. | |
| 2017/0361558 A1 | 12/2017 | Tenore et al. | |
| 2018/0056262 A1 | 3/2018 | Miller et al. | |

FOREIGN PATENT DOCUMENTS

| | | | |
|---|---|---|---|
| CL | 199800382 | 11/1998 | |
| CL | 201803679 | 12/2018 | |
| CN | 1968765 A | 6/2005 | |
| CN | 101700692 A | 10/2009 | |
| CN | 101616970 A | 12/2009 | |
| CN | 104211629 A | 5/2013 | |
| CN | 103153450 A | 6/2013 | |
| CN | 202988144 U | 6/2013 | |
| CN | 204699419 U | 10/2015 | |
| CN | 204737927 U | 11/2015 | |
| CN | 105542830 A | 5/2016 | |
| DE | 1769235 A1 | 10/1971 | |
| DE | 19724146 A1 | 12/1998 | |
| DE | 10201869 A1 | 1/2002 | |
| DE | 102 01 869 A1 | 7/2003 | |
| DE | 10201869 A1 | 7/2003 | |
| DE | 10201869 A1 * | 7/2003 | B29C 48/2886 |
| DE | 102 01 869 B4 | 8/2005 | |
| DE | 202013007632 U1 | 10/2013 | |
| DE | 20 2013 009 015 U1 | 1/2014 | |
| DE | 20 2013 009 015 U1 | 3/2014 | |
| GB | 766003 | 1/1957 | |
| GB | 1174133 | 5/1967 | |
| JP | 50-60681 U | 6/1975 | |
| JP | 6063543 U | 5/1985 | |
| JP | 60-179407 U | 11/1985 | |
| JP | 6117879 B2 | 5/1986 | |
| JP | 62187791 A | 8/1987 | |
| JP | 2-229588 U | 9/1990 | |
| JP | 7505824 A | 6/1995 | |
| JP | 8334221 A | 12/1996 | |
| JP | 9104874 A | 4/1997 | |
| JP | 2000001677 A | 6/1998 | |
| JP | 2000001677 A | 1/2000 | |
| JP | 20000107272 A | 1/2000 | |
| JP | 2002037916 A | 7/2000 | |
| JP | 2001296009 A | 10/2001 | |
| JP | 2003-10825 A | 1/2003 | |
| JP | 2006-89742 A | 4/2006 | |
| JP | 2007529574 A | 10/2007 | |
| JP | 2007-332222 A | 12/2007 | |
| JP | 2008155582 A | 7/2008 | |
| JP | 2009007537 A | 1/2009 | |
| JP | 2009096966 A | 5/2009 | |
| JP | 2010-500170 A | 1/2010 | |
| JP | 2010500170 A | 1/2010 | |
| KR | 20030051913 A | 6/2003 | |
| KR | 10-2003-0051913 B1 | 7/2003 | |
| KR | 20030051913 | 7/2003 | |
| KR | 20030051913 B1 | 7/2003 | |
| KR | 1020030051913 | 7/2003 | |
| KR | 20050013304 A | 2/2005 | |
| KR | 10-2006-0012934 A | 2/2006 | |
| KR | 10-0686370 | 2/2007 | |
| KR | 10-0686370 B1 | 2/2007 | |
| KR | 100686370 B1 | 2/2007 | |
| KR | 1020090117377 A | 11/2009 | |
| KR | 101006224 B1 | 1/2011 | |
| KR | 20120103832 A | 3/2011 | |
| KR | 10-2012-0103832 A | 9/2012 | |
| KR | 20120103832 A | 9/2012 | |
| KR | 10-2014-0110906 A | 9/2014 | |
| SU | 509433 A1 | 4/1976 | |
| SU | 509433 A1 * | 4/1976 | B29B 9/00 |
| SU | 509433 A1 | 5/1976 | |
| WO | 90/11475 | 10/1990 | |
| WO | 90/11475 A1 | 10/1990 | |
| WO | 01/05910 A1 | 1/2001 | |
| WO | 0105910 A1 | 1/2001 | |
| WO | 2008/017953 A2 | 2/2008 | |
| WO | 2008017953 A2 | 2/2008 | |
| WO | 2009/129233 A2 | 10/2009 | |
| WO | 2009129233 A2 | 10/2009 | |
| WO | 2011/132210 A1 | 10/2011 | |
| WO | 2017221181 A1 | 12/2017 | |

OTHER PUBLICATIONS

DE10201869A1_ENG (Espacenet machine translation of Bayer) (Year: 2003).*

SU509433A1_ENG (Espacenet machine translation of Klamishevich) (Year: 1976).*

Search Report and Written Opinion received in PCT Application No. PCT/162017/053713 dated Sep. 20, 2017.

Search Report and Written Opinion received in PCT Application No. PCT/162017/053714 dated Sep. 20, 2017.

Search Report and Written Opinion received in PCT Application No. PCT/IB2017/052811 dated Aug. 7, 2017.

Search Report and Written Opinion received in PCT Application No. PCT/IB2017/053667 dated Sep. 12, 2017.

Search Report and Written Opinion received in PCT Application No. PCT/IB2017/054058 dated Nov. 9, 2017.

Office Action received in U.S. Appl. No. 15/641,471 dated Feb. 12, 2018.

Office Action received in U.S. Appl. No. 15/062,319 dated Feb. 2, 2018.

Non-Final Office Action in corresponding U.S. Appl. No. 15/477,312 dated Sep. 17, 2018.

Non-Final Office Action in corresponding U.S. Appl. No. 15/054,903 dated Oct. 3, 2018.

Non-Final Office Action in corresponding U.S. Appl. No. 15/593,579 dated Oct. 3, 2018.

Non-Final Office Action in corresponding U.S. Appl. No. 15/641,471 dated Oct. 25, 2018.

U.S. Office Action dated May 3, 2018 in U.S. Appl. No. 15/062,319.

U.S. Office Action dated Jun. 6, 2018 in U.S. Appl. No. 15/641,471.

Office Action received in U.S. Appl. No. 15/641,471 dated Apr. 1, 2019.

Office Action received in U.S. Appl. No. 15/628,844 dated Feb. 26, 2019.

Office Action received in U.S. Appl. No. 15/628,922 dated Apr. 29, 2019.

Office Action received in U.S. Appl. No. 16/263,088 dated May 8, 2019.

Office Action received in U.S. Appl. No. 16/263,088 dated Aug. 29, 2019.

Office Action received in U.S. Appl. No. 15/641,471 dated Aug. 15, 2019.

Office Action received in U.S. Appl. No. 15/628,844 dated Jun. 19, 2019.

Office Action received in U.S. Appl. No. 15/628,922 dated Aug. 27, 2019.

Official Action received in Chilean Application No. 201803679 (3679-2018) dated Aug. 1, 2019.

Office Action received in U.S. Appl. No. 15/641,471 dated Sep. 27, 2019.

(56) References Cited

OTHER PUBLICATIONS

Office Action received in U.S. Appl. No. 15/628,844 dated Sep. 11, 2019.
Office Action received in U.S. Appl. No. 15/628,922 dated Nov. 5, 2019.
Office Action received in Australian Patent Application No. 2017293458 dated Oct. 31, 2019.
Office Action received in New Zealand Patent Application No. 749216 dated Nov. 15, 2019.
Search Report and Expert Report received in Chilean Application No. 201803676 dated Dec. 16, 2019.
Extended European Search Report received in European Application No. 17814858.1 dated Jan. 8, 2020.
Expert Report received in Chilean Application No. 201803174 dated Dec. 31, 2019.
Office Action received in Chinese Application No. 201780042577.0 dated Jan. 21, 2020.
Extended European Search Report received in Application No. 17795725.5 dated Nov. 26, 2019.
Search Report and Expert Report received in Chilean Application No. 201803831 dated Nov. 13, 2019.
Office Action received in Canadian Application No. 3,029,578 dated Nov. 18, 2019.
Search Report and Expert Report received in Chilean Application No. 201803876 dated Dec. 2, 2019.
Extended European Search Report received in Application No. 17823741.8 dated Nov. 15, 2019.
Office Action received in Japanese Application No. 2018-568343 dated Jan. 8, 2020.
Office Action received in Korean Application No. 10-2019-7003338 dated Nov. 20, 2019.
Office Action received in U.S. Appl. No. 15/641,471 dated Jan. 21, 2020.
Written Opinion received in Singapore Application No. 11201810958U dated Feb. 18, 2020.
Extended European Search Report received in European Application No. 17814859.9 dated Jan. 30, 2020.
Written Opinion received in Singapore Application No. 11201810944S dated Feb. 18, 2020.
Official Action received in Chile Application No. 201803174 dated Mar. 16, 2020.
Extended European Search Report received in European Application No. 17823725.1 dated Feb. 27, 2020.
Examination Report received in New Zealand Application No. 749216 dated Feb. 27, 2020.
Office Action received in U.S. Appl. No. 15/641,471 dated Mar. 18, 2020.
Official Action received in Columbian Patent Application No. NC2019/0000773 dated Apr. 28, 2020.
Official Action received in Brazilian Patent Application No. BR112019000051-8 dated May 11, 2020.
Official Action received in Japanese Patent Application No. 2018-568343 dated May 15, 2020.
Official Action received in New Zealand Patent Application No. 749216 dated Apr. 20, 2020.
Official Action received in U.S. Appl. No. 15/628,922 dated Apr. 9, 2020.
Official Action received in Chilean Patent Application No. 201803676 dated Mar. 16, 2020.
Official Action received in Chilean Patent Application No. 201803679 dated Mar. 31, 2020.
Official Action received in Chilean Patent Application No. 201803831 dated Mar. 16, 2020.
Office Action received in Dominican Republic Application No. P2018-0286 dated Sep. 28, 2020.
Office Action received in Panamanian Application No. 92484-01.
Office Action received in Brazilian Application No. BR112018076425-6 dated Aug. 10, 2020.
Office Action received in Chinese Application No. 2017800378727 dated Oct. 14, 2020.
Office Action received in Panamanian Application No. 92477-01.
Office Action received in Columbian Application No. NC2018/0013306 dated Sep. 14, 2020.
Office Action received in Dominican Republic Application No. P2018-0250 dated Sep. 28, 2020.
Office Action received in Korean Application No. 10-2018-7035626 dated Aug. 21, 2020.
Office Action received in Chinese Application No. 2017800417242 dated Oct. 20, 2020.
Office Action received in Chilean Application No. 201803876 dated Aug. 12, 2020.
Office Action received in Chinese Application No. 2017800417331 dated Aug. 20, 2020.
Office Action received in Dominican Republic Application No. P2018-0294 dated Sep. 28, 2020.
Office Action received in U.S. Appl. No. 15/628,922 dated Aug. 24, 2020.
Office Action received in Brazilian Patent Application No. BR112018076624-0 dated Oct. 28, 2020.
Office Action received in Japanese Patent Application No. 2018-566447 dated Nov. 10, 2020.
Examination Report received in Indian Patent Application No. 201927001910 dated Nov. 13, 2020.
Office Action received in Chinese Patent Application No. 2017800425770 dated Nov. 17, 2020.
Examination Report received in Indian Patent Application No. 201827046572 dated Dec. 2, 2020.
Office Action received in Brazilian Patent Application No. BR112019000218-9 dated Nov. 16, 2020.
Examination Report received in Indian Patent Application No. 201927004293 dated Oct. 20, 2020.
Office Action received in Japanese Patent Application No. 2018-568870 dated Nov. 12, 2020.
Official Action received in European Patent Application No. 17 823 741.8-1104 dated Nov. 4, 2020.
Examination Report received in Indian Patent Application No. 201927004072 dated Nov. 24, 2020.
Office Action received in Chinese Application No. 201780038052X dated Aug. 5, 2020.
Written Opinion received in Singapore Application No. 11201810944S dated Jul. 31, 2020.
Notification received in ARIPO Application No. AP/P/2018/011139 dated Aug. 12, 2020.
Office Action received in Brazilian Application No. BR112018073056-4 dated Jun. 16, 2020.
Office Action received in Chinese Application No. 2017800425770 dated Jun. 19, 2020.
Official Action received in Columbian Application No. NC2018/0013306 dated May 28, 2020.
Office Action received in Japanese Application No. 2019-512039 dated Jul. 2, 2020.
Office Action received in Brazilian Application No. BR20112019000218-9 dated Jun. 6, 2020.

\* cited by examiner

BAG PRESS FEEDER ASSEMBLY

CROSS-REFERENCE TO RELATED APPLICATIONS

This application is a continuation-in-part of U.S. application Ser. No. 15/479,560, filed Apr. 5, 2017, entitled "BAG PRESS SEPARATOR", which claims priority from U.S. Provisional Application No. 62/319,768, filed Jun. 21, 2016, entitled "BAG PRESS SEPARATOR".

This application makes reference to U.S. Provisional Application No. 62/318,178, filed Jun. 21, 2016, entitled "CHAR SEPARATOR"; U.S. application Ser. No. 15/477,312, filed Apr. 3, 2017, entitled "CHAR SEPARATOR"; U.S. patent application Ser. No. 15/054,903, filed May 12, 2016, entitled "CYCLONIC CONDENSING AND COOLING SYSTEM"; International Application No. PCT/IB2017/052811, filed May 17, 2017, entitled "CYCLONIC CONDENSING AND COOLING SYSTEM"; U.S. patent application Ser. No. 15/062,319, filed Jul. 8, 2016, entitled "HEATED AIRLOCK FEEDER UNIT"; International Application No. PCT/IB2017/053667, filed Jun. 20, 2017, entitled "HEATED AIRLOCK FEEDER UNIT"; U.S. Provisional Application No. 62/493,445, filed Jul. 5, 2016, entitled "CONVERTING WASTE PLASTIC INTO FUEL"; U.S. patent application Ser. No. 15/593,579, filed May 12, 2017, entitled "CYCLONIC CONDENSING AND COOLING SYSTEM"; U.S. patent application Ser. No. 14/757,227, filed Dec. 8, 2015, entitled "HEATED AIRLOCK FEEDER UNIT"; U.S. Provisional Application No. 62/089,617, filed Dec. 9, 2014, entitled "FEEDING REACTOR/EXTRUDER"; U.S. Provisional Application No. 62/089,628, filed Dec. 9, 2014, entitled "CYCLONIC CONDENSATION SYSTEM"; U.S. patent application Ser. No. 14/964,521, filed Dec. 9, 2015; U.S. Patent Application filed Dec. 9, 2015, entitled "HEATED AIRLOCK FEEDER UNIT"; U.S. Application filed Dec. 9, 2015, entitled "CYCLONIC COOLING SYSTEM"; U.S. Provisional Application No. 62/270,565, filed Dec. 21, 2015, entitled "BAG PRESS FEEDER"; U.S. Provisional Application filed Dec. 13, 2015, entitled "CHAR SEPARATOR"; U.S. Provisional Application No. 62/089,635, filed Dec. 9, 2014, entitled "RADIANT AIR CHILLER". The entire contents and disclosures of these patent applications are incorporated herein by reference.

BACKGROUND

Field of the Invention

The present invention relates generally to a device for heat exchanged technology. More particularly, it relates to an apparatus that is part of a re-useable fuel processing unit for recycling plastic materials into refined fuel.

Background of the Invention

The use of feeder airlock systems in re-useable energy apparatus is known. Examples of known devices include U.S. Pat. No. 5,762,666 to Amrein et. al, U.S. Pat. No. 3,151,784 to Tailor, and U.S. Pat. No. 3,129,459 to Kullgren et. al. These patents teach airlocks with side gates (Amrein et. al.), a rotary feeder to an airlock using vanes (Tailor), and an extruder using electric heat (induction) (Kullgren). The Tailor device teaches a rotary style apparatus in which steel vanes are mounted to a shaft and spin inside a machined round housing. An opening is in the top and bottom of the housing to allow material to flow in and out of the housing. The vanes block the difference pressures between the inlet and outlet. However, multiple limitations exist within this design. A first limitation is that the prior art re-useable energy apparatus will not tolerate heat as the disclosed structural design of the prior art will expand and allow internal pressures to leak outwardly. Another limitation is that the vanes act as pockets and also carry the atmosphere from the inlet to the outlet. A third limitation concerns the rotation velocity. The rotation velocity must be slow to allow time for the material to fall out of the discharge or material will be carried back around and prevent refill from the inlet. A fourth limitation is that prior art devices will not allow for a molten material, e.g., such as hot plastic, to traverse therethrough.

The Amrein device discloses a feeder airlock system using two valves, with a hopper or pipe between them to allow material fill. Although this design tolerates heat, it allows the atmosphere to enter the feeder from the inlet and pass through to the discharge. The Amrein device, however, is limited in that the device does not allow atmospheric gases in some processes as they will cause problems downstream. Another limitation with this device includes the incapability for allowing molten material, such as hot plastic, to traverse therethrough.

The Kullgren device discloses an induction heated extruder. Kullgren describes an extruder that employs induction heating with the use of electric coils. Limitations with this apparatus include lacking an ability to create an airlock within its system. Thus, the described system is not conducive to allowing continuous feeding of plastic material(s). Additionally, the system of Kullgren requires a thick long barrel that requires very high horsepower to achieve an internal pressure along with the required heat necessary to melt plastic material. Hence, the device of Kullgren drives up operating costs and expenses due to its high power requirement.

Processing plastic type materials, such as plastic bags, in conventional prior art systems is known to be problematic. For example, due to the characteristically light weight nature of the plastic type materials, difficulties exist for processing and feeding the same into an extruder. For instance, plastic bag materials possess an extremely low non-compressed weight averaging three pounds per cubic foot and, due to their aforementioned light weight characteristics, plastic bag materials have a tendency to spring open, float when moved and form a very large bridge when stored.

Thus, the prior art does not readily provide continuous feeding and conveying of heated plastic materials. Additionally, the prior art does not easily provide systems for addressing recycled plastic materials for conversion into to refined fuel products. Furthermore, prior art systems prove problematic in achieving an air lock for feeding and manipulating heated plastic materials for subsequent processing.

Therefore, there is a need for producing a more efficient re-useable energy apparatus that provides capability for processing plastic type materials into usable and/or re-usable fuel products.

SUMMARY

According to first broad aspect, the present invention provides a material handling apparatus comprising a material press body having an inlet and an outlet; a power source for generating an airstream into the inlet of the material press body and through the outlet of the material press body, wherein the airstream captures and feeds a supply material into the material press body; a plurality of press augers for capturing and manipulating the supply material into the material handling apparatus; and a drive system connected to drive and control the plurality of augers.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Definitions

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present invention, the term "comprising", the term "having", the term "including," and variations of these words are intended to be open-ended and mean that there may be additional elements other than the listed elements.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing FIG.s may be flipped over, rotated by 90° in any direction, reversed, etc.

For purposes of the present invention, a value or property is "based" on a particular value, property, the satisfaction of a condition, or other factor, if that value is derived by performing a mathematical calculation or logical decision using that value, property or other factor.

For the purposes of the present invention, the term "de-stoner hood" refers to a device that separates solid heavy objects from entering a prescribed area. In one exemplary embodiment, the de-stoner hood may be configured to prevent heavy objects like steel or aluminum from entering into the bag press hopper of the disclosed embodiment.

For the purposes of the present invention, the term "identical" refers to being similar in every detail; exactly alike.

For purposes of the present invention, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

Description

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

Plastic waste material may be shredded and fed, for example, into a reactor (e.g., a pyrolysis reactor). Applying heat above 350 degrees Celsius will cause the shredded plastic material to melt and vaporize. Ultimately, an upstream reactor may utilize back pressure to assist in the thermal cracking of carbon chains present in the plastic material to produce a refined fuel or re-useable fuel for subsequent use.

This application relates to an apparatus that may be part of a re-useable fuel processing unit. In one disclosed embodiment, an apparatus assembly may be used to feed plastic material into a reusable fuel processing unit including a pneumatic feed having a blower as a power source. It should be appreciated that the blower may be powered by the heat used to melt and vaporize the shredded plastic. The assembly may also include a screened air outlet, a plurality of press augers, a pinch conveyer system, a de-stoner hood, a receiver hopper, a low and high level indicators, ram, press screw inlet, pneumatic air cylinder, bag press inlet, outlet, and amp monitor. The pneumatic feed may be configured to move the plastic material at a fixed rate to the press feed receiver. The blower is used as a power source in which air from the blower is pulled through a screened hood. The screened air outlet may be substantially configured as the same identical shape as the bag press body. The press screw augers wipe the screen as they rotate allowing air flow through the bag press, ram, and receiver. A pinch conveyer system collects loose plastic material(s), such as plastic bags, and compresses them into a de-stoner hood (having a comparatively large body) allowing compressed plastic material(s) (e.g., plastic bags) to expand when disposed inside the de-stoner hood. The plastic material(s) (e.g., plastic bags) are conveyed into a receiver hopper thereby triggering a level indicator and starting a ram mechanism. The ram acts as an air cut-off gate that will push material into a press screw inlet. Once the ram starts to move, the pinch conveyer stops, thereby preventing material from entering the receiver hopper. Thus, the ram also acts as a cut-off gate. In a disclosed embodiment, the ram is pushed by a pneumatic air cylinder towards the bag press inlet. The ram may be configured to be larger than the receiver opening and designed with substantially the same identical matching face as the press screw augers. Full details of described embodiments are provided below.

Figure 1:
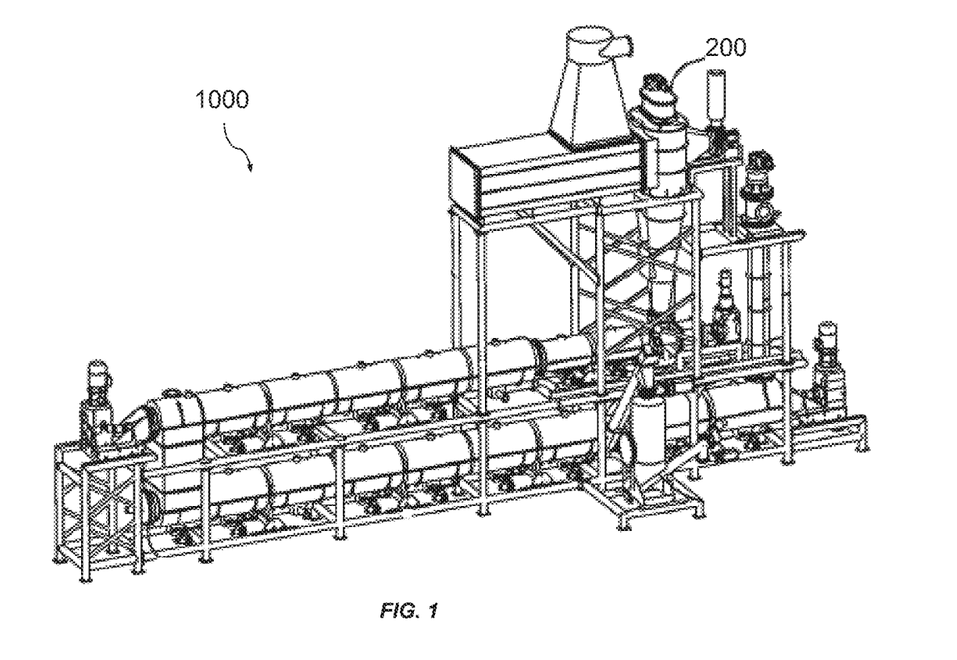
FIG. 1 is a schematic illustration of a re-useable energy apparatus according to one embodiment of the present invention.

Turning to FIG. 1, a disclosed embodiment of a heated airlock feeder or system 1000 is illustrated showing an apparatus in which the shredded plastic material is fed into a reactor (such as a pyrolysis reactor). The disclosed bag press feeder assembly 200 may be employed as part of a re-useable fuel processing unit that is readily configured for continuously feeding recycled plastic materials and heating the same for subsequent processing into a fuel source, as described below.

Plastic bag type materials are known to be difficult to process feed into conventional prior art systems due to the inherent light weight nature of their material design. Such plastic bag type materials may possess a very low non-compressed weight averaging, for example, approximately three pounds per cubic foot. Furthermore, such aforementioned materials may have a tendency to spring open, float when moved and form a very large bridge when stored. Embodiments of the disclosed design address and solve previous problems related to plastic bag conveying, receiving, storing and feeding and as described above.

Figure 2:
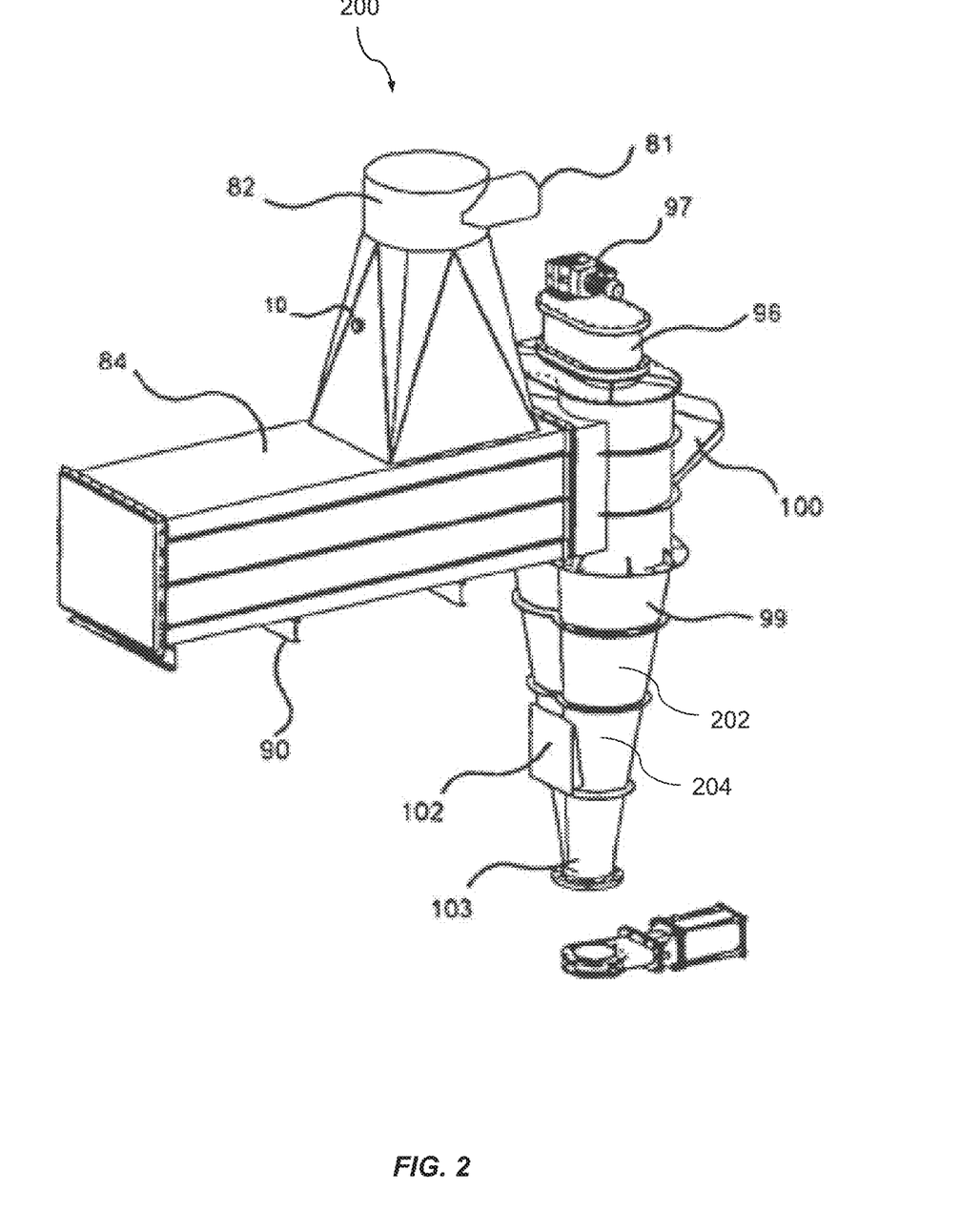
FIG. 2 illustrates an assembled view of a bag press feeder assembly according to one embodiment of the present invention.
Figure 3:
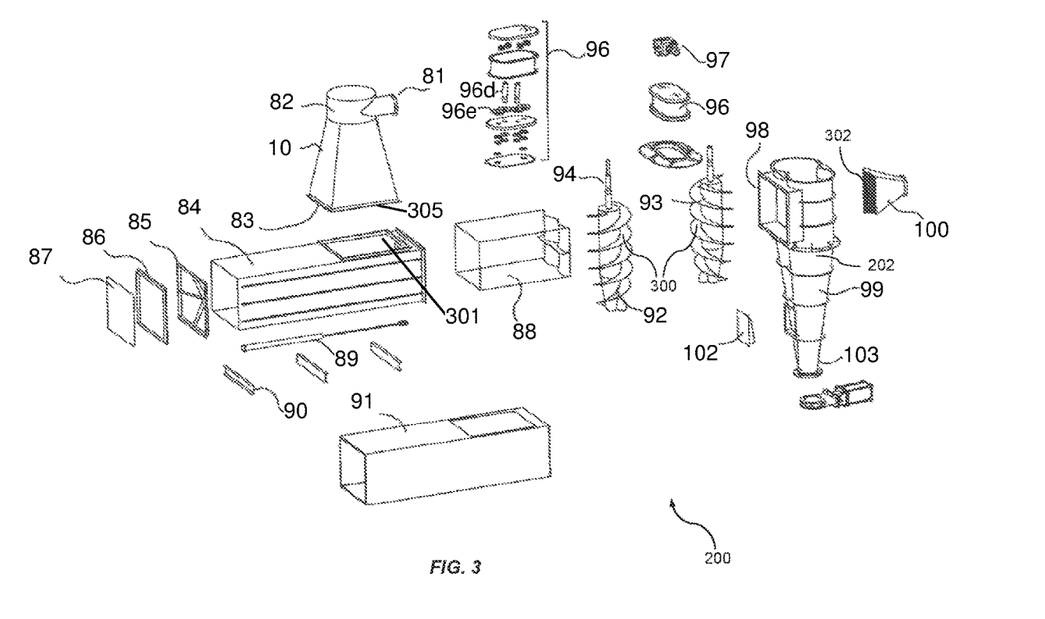
FIG. 3 illustrates an exploded view of the bag press feeder assembly of FIG. 2 according to one embodiment of the present invention.

The disclosed bag press feeder assembly may be constructed from a variety of materials. Carbon steel may typically be employed in the disclosed design, but other alloys may be applied if required by certain conditions. Stainless steel or aluminum may also be employed within a construction design. Turning to FIGS. 2 and 3, the design of the bag press feeder assembly 200 allows light materials to be collected and compressed into a higher density material. The inlet 81 of the unit is tangential to help allow the separation of the conveying air from the material. Eliminating air from within the disclosed design is important to remove or drastically reduce opportunities for combustion in an otherwise flammable working environment.

The plastic material being collected into the receiving hopper 82 is built to a point that a photo eye will indicate the level of material. This indicator will transmit a signal to a controller to stop the flow of material when capacity is indicated. In one disclosed embodiment, a ram press is configured to pull material from receiving hopper 82 into a ram housing or press chamber 84, as material is lowered below the photo eye, more material is conveyed into receiving hopper 82.

Plastic material may enter in either a clockwise or counterclockwise rotation based on a required design. As plastic material enters and circulates in the upper section of the receiver, it drops, due to gravity, into the lower section. This section is designed to allow material to continuously fall and not bridge. The upper diameter is smaller than the base discharge area creating a negative wall that forces any materials that would swell and cause bridging to be pushed in a downward direction following the sidewall shape.

Below the receiving hopper depicted on FIG. 2 at 82 is a square housing lined with ultra-high-molecular-weight polyethylene (UHMW) or low friction plastic, that has a void filling ram device 88 inside. In one disclosed embodiment, the housing is configured as a square geometry. Ram device 88 is powered by a pneumatic air cylinder-. In some embodiments, ram device 88 may be conceptualized as a ram plug, for example, configured to travel inside the polymer liner 91 in a linear direction. The press chamber 84 is of a prescribed shape (e.g., a generally square shape profile) with external support bars and matching connection flanges or seal flanges 86 and an inlet or connecting flange 83. A polymer liner, UHMW or nylon, is used to reduce the drag of the ram device 88 as it is pushed.

Air cylinder 89 is mounted to a support frame 85 at the tail of the press chamber depicted on FIG. 2 at 84. The other end of the air cylinder is connected inside ram device 88, e.g., to a plate that matches the auger's profile. The back end of the press chamber 84 is sealed to prevent air leakage with a seal plate 87. By sealing the chamber, air movement is allowed to enter into the receiving hopper at the product inlet port 81, through press chamber 84, through the press body, and then through the air discharge hood 100 and into a fan that can be located remotely. In some disclosed embodiments, air discharge hood 100 may be screened and serve as a screened air outlet transition hood.

The movement of ram device 88 slides beyond the opening depicted at 301, allowing material to fall from the receiving hopper 82 into press chamber 84 through the opening 301 at connecting flange 83. Ram device 88 is pulled to the rear of press chamber 84 which allows for a large volume of material to drop in front of the RAM to be subsequently guided and pushed into the press device. Pneumatic cylinder 89 extends and pushes ram device 88 into an opening 98 of the bag press feeder 202.

The bag press feeder 202 consists of a press body or vertical double body 204 with a matching inlet flange 98 and an air discharge hood 100. Bag press feeder 202 connects to a support frame 90 and to a lower hopper that comprise split eccentric reducers all of which may be welded to match up to the body and to the single diameter discharge flange. Within press body 204, counter rotating double flighted augers 92, 93 may be disposed. Augers 92, 93 are configured to receive and grab incoming material and manipulate the same to push the material to the lower hopper.

Augers 92 and 93 are located in a drum measuring approximately fourteen inches in diameter for each auger with heavy screw flight material welded solidly around the drum. The drum is designed as a lower tapered cone to match the bag press body shape. The drive shaft at 94 is supported and welded through the drum and extends into the gearbox 96. Augers 92 and 93 are constructed where one has right-hand rotation the other has left-hand rotation. The left-hand and right-hand augers overlap. Due to this overlap augers 92, 93 act as self-cleaning mechanisms while pushing the plastic material downward into the lower section of the bag press feeder hopper. The pressure within the bag press feeder 202 increases as material is forced from the large opening at the top of the bag press feeder into the lower small opening of the bag press feeder. An access door 102 is a plug type door used to maintain the internal shape. Plastic material is pulled into the receiving hopper at the product inlet 81 by a fan located on the backside of a screened air discharge hood 100.

Main augers 92 and 93 may be configured as drum style augers. The concept of the drums is to have a large circumference preventing materials like plastic bags from wrapping completely around the drum. The disclosed design, along with overlapping, counter rotating auger flights prevents material from wrapping around the drum augers 92, 93. The base of the drum augers has two flights ending 180 degrees apart due to the double flights. Because the drum has flights on both sides that are 180 degrees apart, the force pressure downward does not deflect the drum auger when compressing material below.

As best illustrated in FIG. 3, a drive system may be provided to connect to and control augers 92, 93. The drive system may include a gearbox or drive mechanism 96 that may be powered, for example, by a helical gear motorized drive box or motor drive 97. Drive mechanism 96 may be maintained, for example, within a drive housing. From inside the drive housing exits transfer shafts 96*d*, spur gears 96*e* seals and bearings. The use of a multitude of spur gears 96*e* (e.g., four spur gears) reduces the overall size of the gearbox 96. In operation, the centerline difference between the two augers 92, 93 would otherwise require two large gears to meet in the middle, where the use of the four smaller spur gears makes the box smaller while maintaining equal force on all of the shafts.

Accordingly, in one disclosed embodiment, a pneumatic feed is used in the disclosed design to both move the plastic material at a fixed rate to the receiving hopper 82 and to remove any heavy objects. A standard blower may be used for the power source. The air from the blower is pulled through a screened air discharge hood 100 on a back side of a material press body or bag press body 99. In one disclosed embodiment, the screened air discharge hood 100 tapers generally inwardly from a connection point onto a screened air outlet transition 302 may be configured as the same shape as the bag press body depicted at 99 creating a very small gap between augers 92 and 93 and the screen 302. Augers 92 and 93 wipe the screen 302 as it rotates, allowing for air flow through the bag press, ram and receiver. Screen 302 maintains plastic material particles within bag press body 99 thereby preventing them from exiting at air discharge hood 100. However, the design of the screen 302 also allows airflow through the bag press into the bag press body 99 and out through air discharge hood 100 to eliminate and/or greatly reduce an otherwise combustible operating environment.

A conveyor system, such as a pinch conveyor system, may be employed to collect plastic material, such as loose bags, and compress them into a size that will be feed into a de-stoner hood 10. De-stoner hood 10 has a large body and allows the compressed plastic bag material to expand a little once disposed within inside the de-stoner hood. The bags are then conveyed into the receiving hopper 82 into the press chamber. The bags fill receiving hopper 82 to a fixed point triggering a level indicator. This will start ram device 88 disposed below to push material into the press screw inlet 98. As ram device 88 starts to move, the pinch conveyor stops to prevent further material from entering the receiving hopper 82. Ram device 88 also acts as an air cutoff gate as it covers the receiver opening 305 of receiving hopper 82. Receiving hopper 82 has a negative wall design. The incoming material expands when it is inside the receiving hopper 82. The hopper gets larger as its gets closer to the ram inlet at opening 305. Ram device 88 is pushed by a pneumatic air cylinder 89 to the bag press inlet 98, and at the same time cuts off the material flow due to its shape as the ram body is larger than the receiver opening 305 disposed above the ram body. Ram device 88 may be configured to have a substantially identical face with the same shape and/or size as the press screw augers 92 and 93 allowing material to be pulled into the press body 99. The plastic material is forced down the augers 92 and 93 by the metal flights 300. Disclosed embodiments provide one left hand flight auger 92 and one right hand flight auger 93 in the press body 99..

As more and more plastic material, such as plastic bags, is collected into the bag press, the plastic material is forced down and is compressed. As the plastic material (e.g., plastic bags) builds up inside the bag press body 99, the plastic material is pushed down where the diameter of the hopper gets smaller and smaller towards a compression area at outlet 103. The increase in material and decrease in area creates a higher density of plastic material and creates a pressurized seal.

The bag press motor drive 97 may include an amp monitor. The amp monitor may be set at a prescribed level to signal when the bag press is full and at the correct pressure. Depending upon the threshold level of the amp monitor, the motor drive is controlled to operate or not operate based upon a prescribe value or amp range. When the material is allowed to discharge, the pressure is reduced in the compression area at outlet 103 and the computer may be initialized to start the fill process while continuing to monitor the motor amps.

Figure 4:
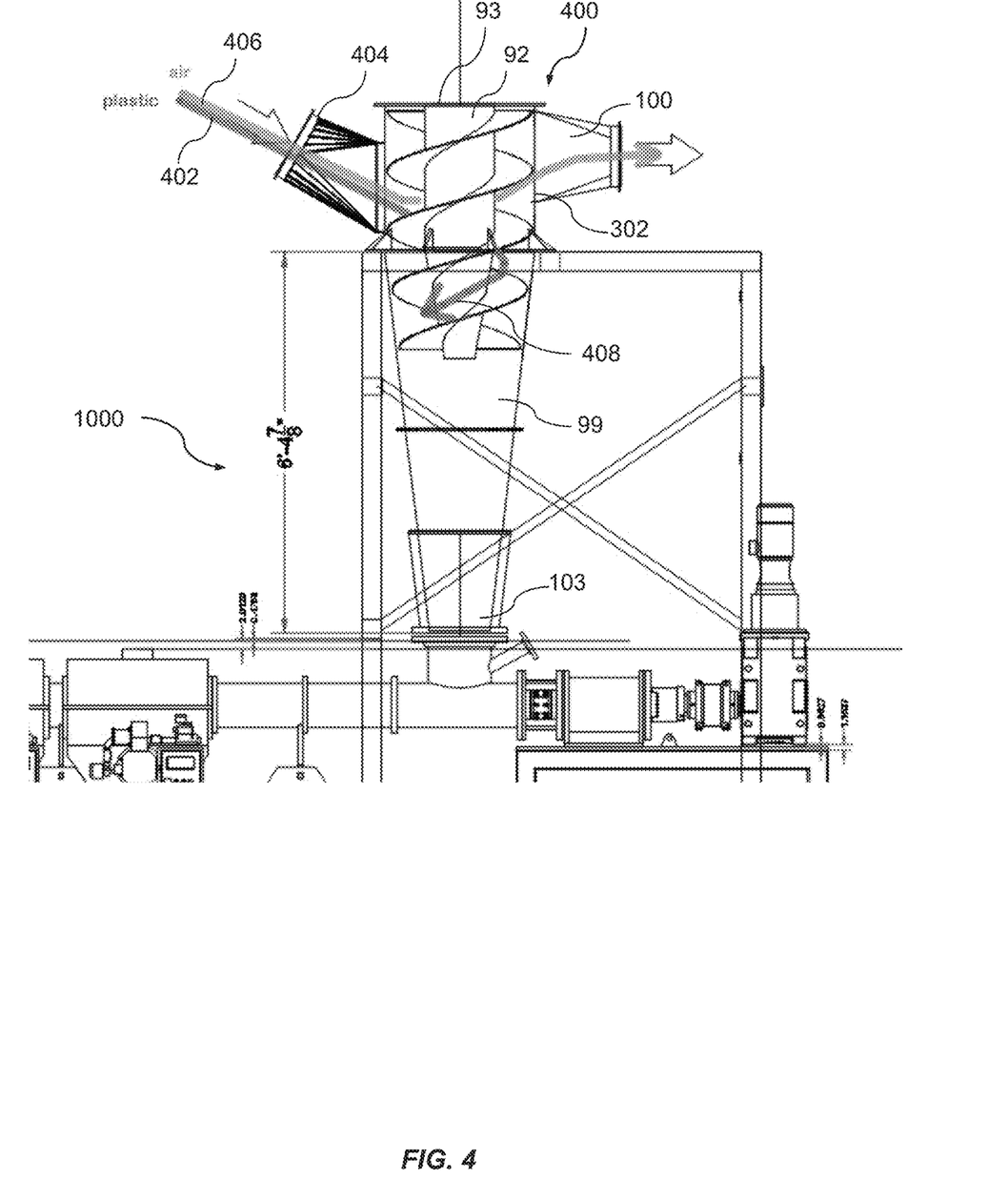
FIG. 4 illustrates an alternate embodiment of a bag press feeder assembly according to another embodiment of the present invention.

Turning to FIG. 4, an alternate embodiment of a bag press feeder assembly is illustrated. A negative vacuum pressure is created within bag press body 99 of material handling apparatus 400 to draw plastic material within. Accordingly, plastic material 402 is feed into inlet 404 of bag press body 99 -by airstream 406. The disclosed configuration receives airstream 406 into inlet 404 of bag press body 99 towards auger 92 (93) and through screen 302 and air discharge hood 100.

A screened air outlet transition 302 may be configured as the same shape as the bag press body depicted at 99 creating a very small gap between augers 92 and 93 and the screen 302. Augers 92 and 93 wipe the screen 302 as it rotates, allowing for air flow through the bag press, ram and receiver. Screen 302 maintains plastic material particles within bag press body 99 thereby preventing them from exiting through screen 302 and air discharge hood 100. However, the design of the screen 302 also allows airflow through the bag press into the bag press body 99 and out through screen 302 and air discharge hood 100 to eliminate and/or greatly reduce an otherwise combustible operating environment.

By design, plastic material 402 is urged towards auger 92 (93) via airstream 406 and the back pressure created within bag press body 99. As more and more plastic material 402 is collected into bag press body 99, plastic material 402 is forced in downward direction 408 as it continues to compress. As plastic material 402 builds up inside bag press body 99, plastic material 402 is pushed downwardly where the diameter of the hopper gets smaller and smaller towards the outlet. The increase in material and decrease in area creates a higher density of material and creates a pressurized seal.

Having described the many embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A material handling apparatus comprising:
a vertical material press body having an inlet and an outlet configured at a first direction away from the inlet, wherein the vertical material press body includes an outlet tapered body structure disposed in a generally transverse direction from the first direction;
a power source for generating an airstream into the inlet of the vertical material press body and through the outlet of the vertical material press body, wherein the airstream captures and feeds a supply material into the vertical material press body generally in the first direction;
a plurality of press augers for capturing and manipulating the supply material into the material handling apparatus in a second direction, wherein the plurality of press augers are disposed in a generally transverse direction from the airstream;
a drive system configured to drive and control the plurality of augers; and
a screen configured in a fixed position and disposed at the outlet of the vertical material press body,
wherein the plurality of press augers are configured to scrape or wipe the screen as they rotate to allow air flow through the vertical material press body.

2. The apparatus of claim 1, wherein the vertical material press body includes a compression area disposed at an outlet tapered body structure.

3. The apparatus of claim 2, wherein a pressurized seal is created at the compression area.

4. The apparatus of claim 1, wherein the screen is configured to prevent the supply material from exiting the outlet but allows the airstream to pass therethrough.

5. The apparatus of claim 1, wherein the plurality of press augers rotate counter to one another.

6. The apparatus of claim 1, wherein the plurality of press augers overlap.

7. The apparatus of claim 1, wherein the plurality of press augers includes two press augers, wherein each auger has metal flights, and wherein one is a right hand flight and one is a left hand flight.

8. The apparatus of claim 1, wherein a base of each plurality of press augers has two flights ending 180 degrees apart.

9. The apparatus of claim 1, wherein the drive system comprises a gearbox.

10. The apparatus of claim 9, wherein the gearbox comprises a helical gear.

11. The apparatus of claim 9, wherein the gearbox comprises spur gears.

12. The apparatus of claim 1, further wherein the power source is a blower.

13. The apparatus of claim 1, further comprising:
an amp monitor that signals when the vertical material press body is full and at the correct pressure.

14. The apparatus of claim 1, further comprising:
a feed for supplying the supply material to the inlet.

15. The apparatus of claim 1, wherein the supply material is plastic.

16. The apparatus of claim 5, wherein the supply material is plastic bags.

17. The apparatus of claim 1, further comprising:
a conveyor system that collects the supply material for feeding into a de-stoner hood.

18. The apparatus of claim 1, wherein the plurality of press augers are configured in a generally vertical direction.

19. The apparatus of claim 1, wherein the first direction is a generally horizontal direction and the second direction is a generally vertical direction.

20. The apparatus of claim 1, wherein the air outlet of the vertical material press body terminates in a hooded outlet.

21. The apparatus of claim 20, wherein the hooded outlet is a de-stoner hood.

22. A material handling apparatus comprising:
a vertical material press body having an inlet and an outlet configured at a first direction away from the inlet, wherein the vertical material press body includes an outlet tapered body structure disposed in a generally transverse direction from the first direction;
a power source for generating an airstream into the inlet of the vertical material press body and through the outlet of the vertical material press body, wherein the airstream captures captures and feeds a supply material into the vertical material press body generally in the first direction;
a plurality of press augers for capturing and manipulating the supply material into the material handling apparatus in a second direction, wherein the plurality of press augers are disposed in a generally transverse direction from the airstream;
a drive system configured to drive and control the plurality of augers; and
a screen configured in a fixed position and disposed at the outlet of the vertical material press body,
wherein the plurality of press augers are configured to scrape or wipe the screen as they rotate to allow air flow through the vertical material press body, and
wherein the power source is a blower and the blower is powered by heat used to melt and vaporize the supply material in the apparatus.

23. The apparatus of claim 22, wherein the plurality of press augers are configured in a generally vertical direction.

24. The apparatus of claim 22, wherein the first direction is a generally horizontal direction and the second direction is a generally vertical direction.

25. The apparatus of claim 22, wherein the outlet of the vertical material press body terminates in a hooded outlet.

26. The apparatus of claim 25, wherein the hooded outlet is a de-stoner hood.

27. A material handling apparatus comprising:
a vertical material press body having an inlet and an air outlet configured at a first direction away from the inlet;
a power source for generating an airstream into the inlet in the first direction towards and through the air outlet of the vertical material press body, wherein the airstream captures and feeds a supply material into the vertical material press body generally in the first direction;
a screen configured in a fixed position and disposed at the outlet of the vertical material press body;
a plurality of press augers configured to receive and manipulate the supply material fed by the airstream into the vertical material press body in a second direction, wherein the second direction is different from the first direction; and
a drive system configured to drive and control the plurality of augers, wherein the vertical material press body comprises an outlet tapered body that is arranged in the second direction.

28. The apparatus of claim 27, wherein the plurality of press augers are configured to scrape or wipe the screen as they rotate, thereby allowing air flow through the vertical material press body.

29. The apparatus of claim 27, wherein the vertical material press body includes a compression area disposed at the outlet tapered body structure.

30. The apparatus of claim 27, wherein the plurality of press augers are configured in a generally vertical direction.

31. The apparatus of claim 27, wherein the first direction is a generally horizontal direction and the second direction is a generally vertical direction.

32. The apparatus of claim 27, wherein the air outlet of the vertical material press body terminates in a hooded outlet.

33. The apparatus of claim 32, wherein the hooded outlet is a de-stoner hood.

34. A material handling apparatus comprising:
   a vertical material press body having an inlet and an air outlet configured at a first direction away from the inlet;
   a power source configured to generate an airstream into the inlet of the vertical material press body in the first direction towards and through the air outlet of the vertical material press body, wherein the airstream captures and feeds a supply material into the vertical material press body generally in the first direction;
   a screen configured in a fixed position and disposed at the outlet of the vertical material press body;
   a plurality of press augers configured to receive and manipulate the supply material fed by the airstream into the material handling press body in a second direction, wherein the second direction is different from the first direction; and
   a drive system configured to drive and control the plurality of augers,
   wherein the vertical material press body comprises an outlet tapered body that is arranged in the second direction,
   wherein the power source is a blower and the blower is powered by heat used to melt and vaporize the supply material in the apparatus.

35. The apparatus of claim 34, wherein the plurality of press augers are configured to scrape or wipe the screen as they rotate, thereby allowing air flow through the vertical material press body.

36. The apparatus of claim 34, wherein the vertical material press body includes a compression area disposed at the outlet tapered body structure.

37. The apparatus of claim 34, wherein the plurality of press augers are configured in a generally vertical direction.

38. The apparatus of claim 34, wherein the first direction is a generally horizontal direction and the second direction is a generally vertical direction.

39. The apparatus of claim 34, wherein the air outlet of the vertical material press body terminates in a hooded outlet.

40. The apparatus of claim 39, wherein the hooded outlet is a de-stoner hood.

* * * * *